(12) United States Patent
Archambault et al.

(10) Patent No.: US 10,089,454 B2
(45) Date of Patent: *Oct. 2, 2018

(54) ENHANCED ACCURACY OF USER PRESENCE STATUS DETERMINATION

(71) Applicant: Microsoft Technology Licensing, LLC, Redmond, WA (US)

(72) Inventors: Anne Marie Renee Archambault, Seattle, WA (US); Jeffrey Scott Berg, Seattle, WA (US); Xiping Zuo, Kirkland, WA (US); Abhishek Agrawal, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/797,586

(22) Filed: Oct. 30, 2017

(65) Prior Publication Data

US 2018/0052985 A1 Feb. 22, 2018

Related U.S. Application Data

(63) Continuation of application No. 13/531,042, filed on Jun. 22, 2012, now Pat. No. 9,836,590.

(51) Int. Cl.
*G01C 3/08* (2006.01)
*G06F 21/32* (2013.01)
(Continued)

(52) U.S. Cl.
CPC ......... *G06F 21/32* (2013.01); *G06K 9/00771* (2013.01); *G06F 2221/2111* (2013.01); *G10L 25/27* (2013.01)

(58) Field of Classification Search
CPC .. G01C 3/08; G01C 3/22; G01S 11/12; G01S 17/89; B60T 7/16
See application file for complete search history.

(56) References Cited

U.S. PATENT DOCUMENTS 4,288,078 A  9/1981  Lugo
4,627,620 A  12/1986  Yang
(Continued)

FOREIGN PATENT DOCUMENTS

CN  101254344 B  6/2010
EP  583061 A2  2/1994
(Continued)

OTHER PUBLICATIONS

"Everywhere Interactive Displays", Retrieved From <<http://domino.watson.ibm.com/comm/research.nsf/pages/r.mobile.innovation.html>>, Jan. 20, 2009, 3 Pages.
(Continued)

*Primary Examiner* — Samantha K Abraham
(74) *Attorney, Agent, or Firm* — Michael Best & Friedrich LLP (57) ABSTRACT

Technologies are described herein for enhancing a user presence status determination. Visual data may be received from a depth camera configured to be arranged within a three-dimensional space. A current user presence status of a user in the three-dimensional space may be determined based on the visual data. A previous user presence status of the user may be transformed to the current user presence status, responsive to determining the current user presence status of the user.

19 Claims, 3 Drawing Sheets

(51) Int. Cl.
  *G06K 9/00*   (2006.01)
  *G10L 25/27*  (2013.01)

(56) References Cited

U.S. PATENT DOCUMENTS

| | | |
|---|---|---|
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,465 A | 8/1993 | Hattori et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,981 A | 10/1996 | Hsiao |
| 5,563,988 A | 10/1996 | Maes et al. |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Lura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,459 A | 8/2000 | Bauer |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,046 B1 | 7/2001 | Waters et al. |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,744,569 B2 | 6/2004 | Geng |
| 6,746,834 B2 | 6/2004 | Kuramitsu et al. |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,496 B2 | 8/2005 | Mizuno et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |

(56) References Cited

U.S. PATENT DOCUMENTS

| | | | |
|---|---|---|---|
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,739,210 | B2 | 6/2010 | Horvitz et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,069,166 | B2 | 11/2011 | Alvarado et al. |
| 8,072,470 | B2 | 12/2011 | Marks |
| 8,810,360 | B2 | 8/2014 | Gritti et al. |
| 2004/0189720 | A1 | 9/2004 | Wilson et al. |
| 2004/0193413 | A1* | 9/2004 | Wilson ............... G06F 3/017 704/243 |
| 2005/0245302 | A1 | 11/2005 | Bathiche et al. |
| 2006/0010400 | A1 | 1/2006 | Dehlin et al. |
| 2006/0034367 | A1 | 2/2006 | Park |
| 2007/0286463 | A1 | 12/2007 | Ritzau et al. |
| 2007/0291108 | A1 | 12/2007 | Huber et al. |
| 2008/0026838 | A1 | 1/2008 | Dunstan et al. |
| 2008/0242231 | A1 | 10/2008 | Gray |
| 2009/0077504 | A1 | 3/2009 | Bell et al. |
| 2009/0168027 | A1 | 7/2009 | Dunn et al. |
| 2009/0189857 | A1 | 7/2009 | Benko et al. |
| 2010/0066821 | A1 | 3/2010 | Rosener et al. |
| 2010/0067708 | A1 | 3/2010 | Groth |
| 2010/0228825 | A1* | 9/2010 | Hegde ............... G06F 21/6218 709/204 |
| 2010/0328074 | A1 | 12/2010 | Johnson et al. |
| 2011/0007079 | A1 | 1/2011 | Perez et al. |
| 2011/0087736 | A1 | 4/2011 | Bieselin |
| 2011/0183645 | A1 | 7/2011 | Chawla |
| 2011/0205147 | A1 | 8/2011 | Wilson et al. |
| 2012/0020480 | A1 | 1/2012 | Visser et al. |
| 2012/0206553 | A1 | 8/2012 | MacDonald |
| 2012/0226981 | A1* | 9/2012 | Clavin ............... G06F 3/005 715/719 |
| 2013/0159350 | A1* | 6/2013 | Sankar ............... G06F 3/011 707/784 |

FOREIGN PATENT DOCUMENTS

| | | |
|---|---|---|
| JP | 8044490 A | 2/1996 |
| WO | 9310708 A1 | 6/1993 |
| WO | 9717598 A1 | 5/1997 |
| WO | 9944698 A2 | 9/1999 |
| WO | 2011067691 A1 | 6/2011 |

OTHER PUBLICATIONS

"Interactions with an Omnidirectional Projector", Retrieved From <<https://chris.pirillo.com/2009/02/28/interactions-with-an-omnidirectional-projector/>>, Feb. 28, 2009, 1 Page.

"Presence and Enhanced Presence—Office 2007 R2", Retrieved From <<https://msdn.microsoft.com/en-us/library/dd941487(v=office.13).aspx>>, Jan. 25, 2012, 3 Pages.

"Simulation and Training", In Division Incorporated, Jan. 1994, 6 Pages.

"Virtual High Anxiety", In Proceedings of the Tech Update, Aug. 1995, 1 Page.

"Final Office Action Issued in U.S. Appl. No. 12/709,799", dated Oct. 17, 2013, 29 Pages.

"Non Final Office Action Issued in U.S. Appl. No. 12/709,799", dated Mar. 14, 2014, 30 Pages.

"Non Final Office Action Issued in U.S. Appl. No. 12/709,799", dated Mar. 19, 2013, 23 Pages.

"Notice of Allowance Issued in U.S. Appl. No. 12/709,799", dated Jul. 18, 2014, 10 Pages.

"Final Office Action Issued in U.S. Appl. No. 13/531,042", dated Feb. 13, 2015, 15 Pages.

"Final Office Action Issued in U.S. Appl. No. 13/531,042", dated Dec. 30, 2015, 21 Pages.

"Final Office Action Issued in U.S. Appl. No. 13/531,042", dated Jan. 11, 2017, 13 Pages.

"Non Final Office Action Issued in U.S. Appl. No. 13/531,042", dated Jun. 23, 2017, 5 Pages.

"Non Final Office Action Issued in U.S. Appl. No. 13/531,042", dated Jul. 1, 2016, 18 Pages.

"Non Final Office Action Issued in U.S. Appl. No. 13/531,042", dated Aug. 24, 2015, 18 Pages.

"Non Final Office Action Issued in U.S. Appl. No. 13/531,042", dated Jul. 22, 2014, 16 Pages.

"Notice of Allowance Issued in U.S. Appl. No. 13/531,042", dated Aug. 11, 2017, 8 Pages.

Aggarwal, et al., "Human Motion Analysis: A Review", In Proceedings of IEEE Nonrigid and Articulated Motion Workshop, Jan. 1997, 13 Pages.

Ahn, et al., "Interactive Immersive Display", In Proceedings of International Conference on Artificial Reality and Telexistence, TSI Workshop, Jan. 2004, 4 Pages.

Azarbayejani, et al., "Visually Controlled Graphics", In Proceedings of the IEEE Transactions on Pattern Analysis and Machine Intelligence, vol. 15, Issue 6, Jun. 1, 1993, pp. 602-605.

Benko, et al., "Sphere: Multi-Touch Interactions on a Spherical Display", In Proceedings of the 21st Annual ACM Symposium on User Interface Software and Technology, Oct. 19, 2008, 10 Pages.

Breen, et al., "Interactive Occlusion and Collision of Real and Virtual Objects in Augmented Reality", In European Computer-Industry Research Centre GmbH Technical Report, Report No. ECRC-95-02, Jan. 1995, 22 Pages.

Brogan, et al., "Dynamically Simulated Characters in Virtual Environments", In Proceedings of IEEE Computer Graphics and Applications, vol. 18, Issue 5, Sep., 1998, 2 Pages Dehos, et al., "Radiometric Compensation for a Low-Cost Immersive Projective System", Retrieved From <<https://hal.archives-ouvertes.fr/hal-00598693>>, Oct. 27, 2008, pp. 130-133.

Fisher, et al., "Virtual Environment Display System", In Proceedings of the ACM Workshop on Interactive 3D Graphics, Oct. 23, 1986, 12 Pages.

Freeman, et al., "Television Control by Hand Gestures", In Proceedings of the IEEE International Workshop on Automatic Face and Gesture Recognition, Jun. 26, 1995, 5 Pages.

Granieri, et al., "Simulating Humans in VR", Published in the British Computer Society, Academic Press, Oct. 12, 1994, 15 Pages.

Hasegawa, et al., "Human-Scale Haptic Interaction with a Reactive Virtual Human in a Real-Time Physics Simulator", In Magazine Computers in Entertainment (CIE)—Theoretical and Practical Computer Applications in Entertainment, vol. 4, Issue 3, Jul. 1, 2006, 12 Pages.

He, Lei, "Generation of Human Body Models", In Thesis Submitted in Partial Fulfillment of the Requirements for the Degree of Master of Science in Computer Science, Apr. 2005, 111 Pages.

Hongo, et al., "Focus of Attention for Face and Hand Gesture Recognition Using Multiple Cameras", In Proceedings of the Fourth IEEE International Conference on Automatic Face and Gesture Recognition, Mar. 28, 2000, 6 Pages.

Isard, et al., "Condensation—Conditional Density Propagation for Visual Tracking", In Proceedings of the International Journal of Computer Vision, vol. 29, Issue 01, Aug. 1998, pp. 5-28.

(56) References Cited

OTHER PUBLICATIONS

Kanade, et al., "A Stereo Machine for Video-rate Dense Depth Mapping and Its New Applications", In Proceedings of IEEE Computer Society Conference on Computer Vision and Pattern Recognition, Jun. 18, 1996, 7 Pages.

Kohler, Markus, "Special Topics of Gesture Recognition Applied in Intelligent Home Environments", In Proceedings of the International Gesture Workshop on Gesture and Sign Language in Human-Computer Interaction, Sep. 1998, 12 Pages.

Kohler, Markus, "Technical Details and Ergonomical Aspects of Gesture Recognition applied in Intelligent Home Environments", Retrieved from <<http://citeseerxist.psu.edu/viewdoc/download?doi=10.1.1.40.4265&rep=rep1&type=pdf>>, Jan. 1997, 35 Pages.

Kohler, Markus, "Vision Based Remote Control in Intelligent Home Environments", In Proceedings of 3D Image Analysis and Synthesis, vol. 96, Nov. 1996, 8 Pages.

Livingston, Mark Alan, "Vision-based Tracking with Dynamic Structured Light for Video See-through Augmented Reality", A Dissertation Submitted to the Faculty of the University of North Carolina at Chapel Hill in Partial Fulfillment of the Requirements for the Degree of Doctor of Philosophy in the Department of Computer Science, Jan. 1998, 145 Pages.

Miyagawa, et al., "CCD-Based Range Finding Sensor", In IEEE Transactions on Electron Devices, vol. 44, Issue 10, Oct. 1997, pp. 1648-1652.

Nagahara, "Wide Field of View Head Mounted Display for Telepresence with an Omnidirectional Image Sensor", In Conference on Computer Vision and Pattern Recognition Workshop, Jun. 16, 2003, 6 Pages.

Pavlovic, et al., "Visual Interpretation of Hand Gestures for Human-Computer Interaction: A Review", In Proceedings of the IEEE Transactions on Pattern Analysis and Machine Intelligence, vol. 19, Issue 7, Jul. 1, 1997, 19 Pages.

Pyo, et al., "iProCam: A Lens-Sharing Projector-Camera System for Augmented Reality Applications", In Proceedings of the Extended Abstracts, Apr. 28, 2007, pp. 2615-2620.

Qian, et al., "A Gesture-Driven Multimodal Interactive Dance System", In Proceedings of the IEEE International Conference on Multimedia and Expo, vol. 3, Jun. 27, 2004, pp. 1579-1582.

Rosenhahn, et al., "Automatic Human Model Generation", In International Conference on Computer Analysis of Images and Patterns, Sep. 5, 2005, pp 41-48.

Shao, et al., "An Open System Architecture for a Multimedia and Multimodal Userinterface", Japanese Society for Rehabilitation of Persons with Disabilities, Aug. 24, 1998, 8 Pages.

Sheridan, et ah, "Virtual Reality Check", In Proceedings of the Technology Review, vol. 96, Issue 7, Oct. 1993, 9 Pages.

Stevens, Jane E., "Flights into Virtual Reality Treating Real World Disorders", In Proceedings of the Washington Post, Science Psychology, Mar. 27, 1995, 2 Pages.

Wren, et al., "Pfinder: Real-Time Tracking of the Human Body", In IEEE Transactions on Pattern Analysis and Machine Intelligence, vol. 19, Issue 7, Jul. 1997, 6 Pages.

Zhao, Liang, "Dressed Human Modeling, Detection, and Parts Localization", A Dissertation Submitted in Partial Fulfillment of the Requirements for the Degree of Doctor of Philosophy at The Robotics Institute Carnegie Mellon University Pittsburgh., Jul. 26, 2001, 121 Pages.

\* cited by examiner

ENHANCED ACCURACY OF USER PRESENCE STATUS DETERMINATION

BACKGROUND

User presence status may refer generally to a current availability of a user. The user can make her user presence status available for others via, for example, an instant messaging client. A simple user presence status may indicate whether the user is available or unavailable. By viewing the user presence status of a user, others can easily determine the availability of the user.

The relevance and usability of the user presence status may depend heavily on the accuracy of the user presence status. An inaccurate or outdated user presence status can effectively defeat the purpose of making the user presence status available. That is, if others believe that a user presence status of a given user is unreliable, then the others may ignore the user presence status provided for the user.

Conventional approaches for automatically determining the user presence status may rely on, for example, user activity on a computer. That is, if a user has been inactive on the computer for a period of time, then the user may be deemed unavailable. However, while the user may not be using the computer, the user may still be present in the office and otherwise available. As such, conventional approaches for automatically determining the user presence status may be inaccurate.

It is with respect to these considerations and others that the disclosure made herein is presented.

SUMMARY

Technologies are described herein for enhancing the accuracy of a user presence status determination. A sensor device including a depth camera and a microphone array may be configured to obtain visual data and/or audio data regarding a three-dimensional space. A user presence status may be determined based on the visual data and/or the audio data obtained from the sensor device. The visual data and/or the audio data may be utilized to enhance other presence data, such as login data, input device data, calendar data, or telephone usage data.

In some example technologies, a method for enhancing a user presence status determination is provided. The method may include receiving visual data from a depth camera configured to be arranged within a three-dimensional space. The method may also include determining a current user presence status of a user in the three-dimensional space based on the visual data. The method may further include transforming a previous user presence status of the user to the current user presence status, responsive to determining the current user presence status of the user.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is generally directed to concepts and technologies for enhancing the accuracy of a user presence status (hereinafter "presence status") determination. Through the use of the concepts and technologies described herein, presence status can be more accurately determined in contrast to conventional approaches. A presence status can be provided by a publishing user through a communications platform. When the presence status has been published, one or more subscribing users can view the presence status of the publishing user through the communications platform. The publishing user and the subscribing user (the publishing and subscribing users collectively referred to as "users") may access the communications platform, and hence the presence status, through a client application, such an instant messaging client, an e-mail client, or a web browser. Each user can serve as a publishing user capable of providing the user's own presence status and/or a subscribing user capable of viewing a presence status of one or more other users.

A presence status can be manually provided by a publishing user and/or automatically determined using a presence determination engine. The presence determination engine may determine the publishing user's presence status based on user presence data (hereinafter "presence data") associated with the publishing user. Some examples of presence data may include login data, input device data, calendar data, and telephone usage data. Login data may indicate whether the publishing user has logged onto a particular computer or account. Input device data may indicate recent activity on a particular computer via an input device, such as a keyboard, mouse, stylus, or touch-screen. Calendar data may indicate whether the publishing user has meetings or other events scheduled. Telephone usage data may indicate when a telephone, such as a voice-over-Internet-protocol ("VoIP") telephone, associated with the publishing user is being used. Such presence data may be collected via central mechanism, such as an enterprise infrastructure, that is configured to monitor the publishing user's computers, calendars, telephone, and the like.

While the presence determination engine can determine the publishing user's presence status based solely on the above presence data, such determination may be inaccurate in some instances. In a first example, the publishing user may have logged onto her computer which indicates availability, but the publishing user may have stepped away from her office without logging off. In a second example, the publishing user may have recent keyboard/mouse activity which indicates availability, but the publishing user may be using her computer to show a colleague some data in an ad hoc (i.e., unscheduled) meeting. In a third example, the publishing user may have no recent keyboard/mouse activity which indicates unavailability, but the publishing user may be available at her desk and performing a non-computer task. In a fourth example, the publishing user's digital calendar may indicate a scheduled meeting which indicates unavailability, but the publishing user may have decided not to attend the meeting or may be back early from the meeting. The above examples of inaccuracies as well as many others may render the presence status unreliable.

According to various embodiments, a sensor device may be arranged in a three-dimensional space where a publishing user may be present. For example, the three-dimensional space may be the publishing user's room or office. The sensor device may include a depth camera adapted to obtain visual data regarding the three-dimensional space. As used herein, the term "depth camera" may refer to an integrated device or multiple separate devices. For example, an illustrative depth camera configuration may include an RGB (red, green, blue) camera and a depth sensor. Also as used herein, the term "visual data" may include image data (e.g., obtained from the RGB camera) and/or depth data (e.g., obtained from the depth sensor). The sensor device may further include a microphone array adapted to obtain audio data regarding sounds in the three-dimensional space.

The sensor device may be configured to provide the visual data and/or the audio data to the presence determination engine. The presence determination engine may be configured to enhance the determination of the publishing user's presence status by utilizing the visual data and/or the audio data received from the sensor device. In some embodiments, the presence engine may use the visual data and/or the audio data to make an independent determination of the publishing user's presence status. In some other embodiments, the presence determination engine may use the visual data and/or the audio data in conjunction with the presence data to make a determination of the publishing user's presence status. In yet some other embodiments, the presence determination engine may use the visual data and/or the audio data to verify or override a previous determination of the publishing user's presence status.

Some examples of ways the presence determination can utilize the visual data are as follows. The visual data may be utilized to indicate the presence of one or more persons in the three-dimensional space. The visual data may also be utilized to indicate an identity of each person (e.g., facial recognition data, color of clothes, visual biometrics, etc.). The visual data may also be utilized to indicate a position of each person relative to the three-dimensional space, relative to one or more objects (e.g., furniture, electronic devices, whiteboards, etc.) in the three-dimensional space, and/or relative to one or more other persons (e.g., facing each other, facing apart, etc.) in the three-dimensional space. The visual data may also indicate a posture of each person (e.g., standing, bent over, sitting, hand raised near an ear, etc.).

Some examples of ways the presence determination can utilize the audio data are as follows. The audio data may be utilized to indicate the presence of one or more persons in the three-dimensional space. The audio data may be utilized to indicate an identity of each person (e.g., voice recognition data, speech patterns, voice biometrics, etc.). The audio data may also be utilized to indicate a position of each person relative to the three-dimensional space, relative to one or more objects in the three-dimensional space, and/or relative to one or more other persons in the three-dimensional space.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
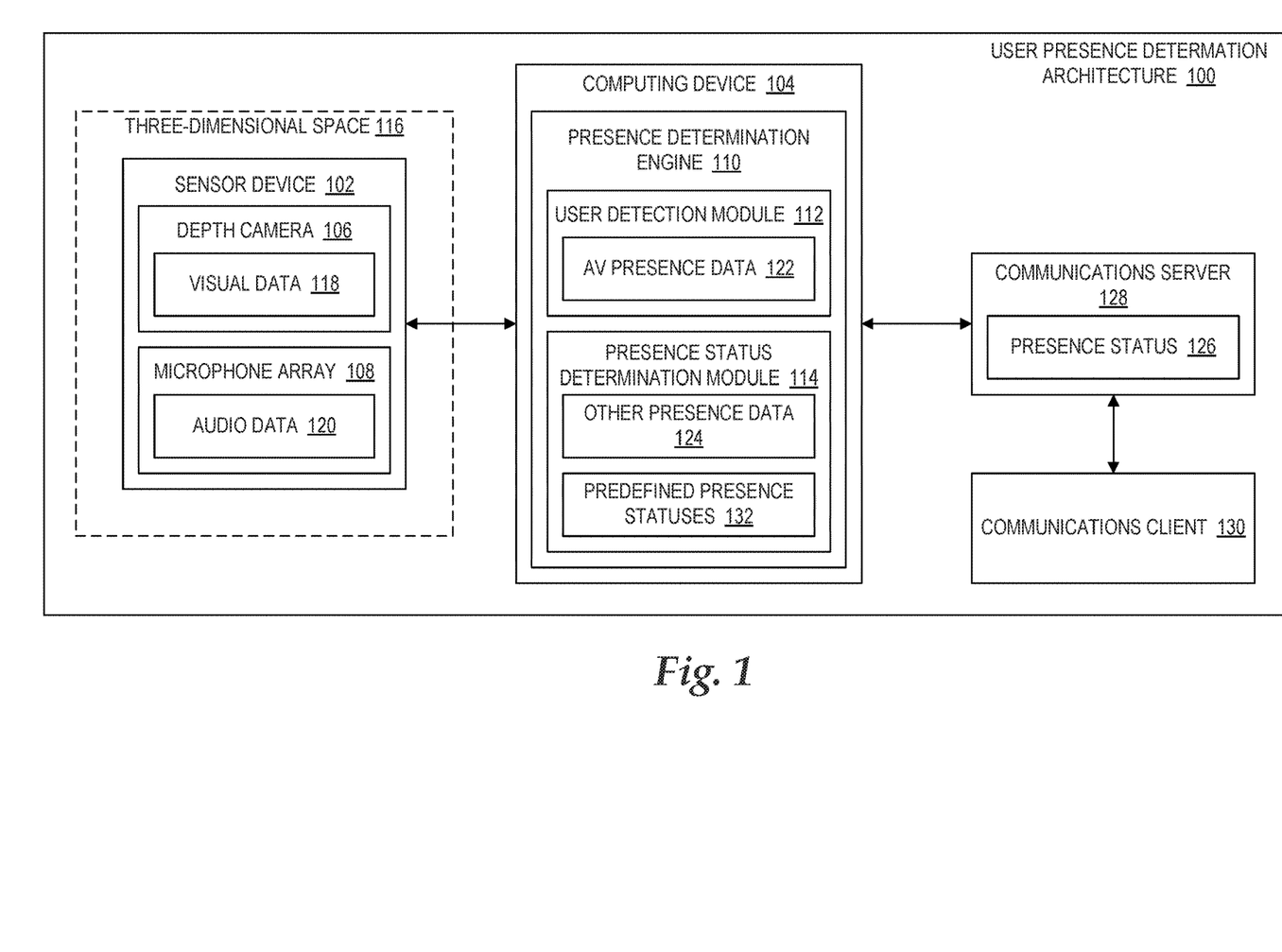
FIG. 1 is a block diagram illustrating an example user presence determination architecture, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, a computing system and methodology for enhancing a determination of user presence status is provided. In particular, FIG. 1 is a block diagram illustrating an example user presence determination architecture 100, in accordance with some embodiments. The user presence determination architecture 100 may include a sensor device 102 operatively coupled to a computing device 104. The sensor device 102 may include a depth camera 106 and a microphone array 108. The computing device 104 may include a presence determination engine 110. The presence determination engine 110 may include a user detection module 112 and a presence status determination module 114.

It should be appreciated that the illustration of the sensor device 102 and the computing device 104 as being two devices is merely an example. For example, the sensor device 102 and the computing device 104 may be configured as a single unit. It should also be appreciated that the illustration of the user detection module 112 and the presence status determination module 114 as being arranged together on the computing device 104 is merely an example. For example, the user detection module 112 and the presence status determination module 114 may be arranged on separate computing devices. One skilled in the art will contemplate various other configurations of the user presence determination architecture 100.

According to various embodiments, the sensor device 102 may be arranged within a three-dimensional space 116. The computing device 104 may or may not be in the three-dimensional space 116. The three-dimensional space 116 may be an open space, a partially enclosed space, or an entirely closed space. The depth camera 106 may be configured to obtain visual data 118 regarding at least a portion of the three-dimensional space 116. The microphone array 108 may be configured to obtain audio data 120 regarding at least a portion of the three-dimensional space 116. It should be appreciated that references made herein to the three-dimensional space 116 may refer to a portion of the three-dimensional space 116 or the entire three-dimensional space 116.

According to various embodiments, the depth camera 106 may include a depth sensor (not shown) and a color complementary metal oxide ("CMOS") sensor (not shown). The depth sensor may include an infrared ("IR") light source and a monochrome CMOS sensor. For example, the IR light source may project a pattern of dots onto a scene, and the monochrome CMOS sensor may detect distortions in the projected pattern caused by the geometry of the scene. These detected distortions may form depth information regarding the scene. The color CMOS camera may collect color information (e.g., red-green-blue or RGB information) regarding the scene. The collected color information may form image information regarding the scene. The depth information and/or the image information may form the visual data 118.

According to various embodiments, the microphone array 108 may include linear array of microphones adapted to record raw audio from one or more sound sources in the three-dimensional space 116. The microphone array 108 may also include an analog-to-digital converter and signal processing hardware configured to perform local signal processing, such as acoustic echo cancellation or noise suppression. The processed raw audio may form the audio data 120.

The sensor device 102 may be configured to provide the visual data 118 (including the depth information and/or the image information) and/or the audio data 120 to the user detection module 112. In some embodiments, the sensor device 102 may also include geolocation capabilities such that the sensor device 102 could provide a location of the sensor device 102 via, for example, a global positioning system ("GPS") receiver or Internet Protocol ("IP") address tracking. The user detection module 112 may be configured to determine audio and/or visual ("AV") presence data 122 based on the visual data 118 and/or the audio data 120. The AV presence data 122 may include an indication of presence of one or more persons in the three-dimensional space 116, an identity of each person in the three-dimensional space 116, a position of each person in the three-dimensional space 116, and/or a posture of each person in the three-dimensional space.

The presence of one or more persons in the three-dimensional space 116 may be determined using the visual data 118 and/or the audio data 120. In one example, the visual data 118 may indicate one or more body shapes at appropriate depths relative to one or more objects in the three-dimensional space 116. In another example, the audio data 120 may indicate one or more different voices originating from one or more persons in the three-dimensional space 116.

In some instances, the user detection module 112 may utilize the visual data 118 and the audio data 120 in conjunction in order to determine a presence of one or more persons in the three-dimensional space 116. For example, the audio data 120 may indicate two voices. If the visual data 118 indicates the presence of two persons, then it can be inferred that two people are present in the three-dimensional space 116. However, if the visual data 118 indicates the presence of only one person, then it might be inferred that one person is present in the three-dimensional space 116 while the other person is on speakerphone. It should be appreciated that a variety of known technologies can determine the presence of one or more persons in the three-dimensional space 116 using the visual data 118 and/or the audio data 120. As such, the determination of presence of one or more persons in the three-dimensional space 116 is not described in further detail herein.

The identity of each person in the three-dimensional space 116 may be determined using the visual data 118 and/or the audio data 120. In one example, the visual data 118 may include facial data or some other visual biometric marker regarding one or more persons in the three-dimensional space 116. Here, the user detection module 112 may determine a personal identity (e.g., name, unique identifier, etc.) of each person in the three-dimensional space 116 using the facial data (e.g., by comparing the facial data to known data of identified users). The user detection module 112 may use a suitable facial recognition technique. In another example, the audio data 120 may include voice data regarding one or more persons in the three-dimensional space 116. Here, the user detection module 112 may determine a personal identity of each person in the three-dimensional space 116 using the voice data (e.g., by comparing the voice data to known data of identified users). The user detection module 112 may use a suitable voice recognition technique.

In yet another example, the visual data 118 may include clothing color or some other suitable distinguishing feature on or connected to each person. While clothing color may not serve to determine a personal identity of each person, the user detection module 112 may use the clothing color to detect an appearance of the same (or different) persons at different times. For example, if a person identified with a red top leaves the office, and five minutes later, a person identified with a blue top enters the office, then it might be inferred that the person identified with the red top is different from the person identified with the blue top. It should be appreciated that the facial data and the voice data, as previously described, may also be similarly used to detect an appearance of the same (or different) persons at different times.

In some instances, the user detection module 112 may utilize the visual data 118 and the audio data 120 in conjunction in order to determine the identity of one or more persons in the three-dimensional space 116. For example, the user detection module 112 may utilize the visual data 118 to identify a person in the three-dimensional space 116 as being one of two possible personal identities. In this case, the user detection module 112 may resolve the ambiguity between the two personal identities by using the audio data 120. It should also be appreciated that a variety of known technologies can determine the identity of one or more persons in the three-dimensional space 116 using the visual data 118 and/or the audio data 120. As such, the determination of the identity of each person in the three-dimensional space 116 is not described in further detail herein.

The position of each person in the three-dimensional space 116 may be determined using the visual data 118 and/or the audio data 120. In one example, the visual data 118 may indicate not only the presence of one or more persons but also the presence of objects (e.g., furniture, electronic devices, whiteboards, etc.) and fixed structures (e.g., walls, columns, etc.) in the three-dimensional space 116. Thus, the user detection module 112 can determine the position of each person relative to the three-dimensional space 116, relative to the one or more objects in the three-dimensional space 116, and/or relative to one or more other persons in the three-dimensional space 116. It should be appreciated that the inclusion of depth information with the image information may improve the determination of the position of each person using the visual data 118. In particular, techniques for determining the position of each person using solely image information without depth information may be less accurate and/or less efficient.

In another example, the user detection module 112 may use the audio data 120 in order to determine a direction from which each sound originates. The direction from which each sound originates may indicate whether two or more people are facing each other or facing apart. If two people are facing each other and speaking, then it can be inferred that the two people are speaking to each other. If two people are facing apart and one person is speaking, then it might be inferred that one person is talking on a telephone. It should be appreciated that a variety of known technologies can determine the position of each person in the three-dimensional space 116 using the visual data 118 and/or the audio data 120. It should also be appreciated that a variety of known technologies (e.g., source localization) can determine a direction from which each sound originates in the three-dimensional space 116 using the audio data 120. As such, the determination of the position of each person in the three-dimensional space 116 and the determination of a direction from which each sound originates are not described in further detail herein.

The posture of each person in the three-dimensional space 116 may be determined using the visual data 118. Some example postures for a person may include standing, sitting, squatting, lying, kneeling, or crouching. As described herein, the posture may also include the arrangement of extremities, such as the arrangement of a user's hands. For example, a posture indicating that a user is sitting and that the user's hand is raised near her ear may indicate that the user is talking on a telephone. It should be appreciated that a variety of known technologies can determine the posture of each person in the three-dimensional space 116 using the visual data 118. As such, the determination of the posture of each person in the three-dimensional space 116 is not described in further detail herein.

When the user detection module 112 has determined the AV presence data 122 based on the visual data 118 and/or the audio data 120, the user detection module 112 can provide the AV presence data 122 to the presence status determination module 114. The presence status determination module 114 may also receive other presence data 124 from a central mechanism, such an enterprise infrastructure configured to monitor a publishing user's computer, calendar, telephone, or the like. The user detection module 112 may determine a presence status 126 for each publishing user based on the AV presence data 122 and the other presence data 124.

Some examples of the other presence data 124 may include login data, input device data, calendar data, and telephone usage data. Login data may indicate whether the publishing user has logged onto a particular computer or account. Input device data may indicate recent activity on a particular computer via an input device, such as a keyboard, mouse, stylus, or touch-screen. Calendar data may indicate whether the publishing user has meetings or other events scheduled. Telephone usage data may indicate when a telephone, such as a VoIP telephone, associated with the publishing user is being used.

The presence status determination module 114 may enhance the determination of the presence status 126 by utilizing the visual data 118 and/or the audio data 120 received from the sensor device 102. In some embodiments, the presence status determination module 114 may use the AV presence data 122 to make an independent determination of the presence status 126. In some other embodiments, the presence status determination module 114 may use the AV presence data 122 in conjunction with the other presence data 124 to make a determination of the presence status 126. In yet some other embodiments, the presence status determination module 114 may use the AV presence data 122 to verify or override a previous determination of the presence status 126.

The presence status 126 may be utilized by a publishing user to provide some information regarding the publishing user to one or more subscribing users. The presence status 126 may be utilized by the publishing user to indicate whether the publishing user is available for contact (e.g., acceptance of incoming communications). For example, the presence status 126 may be published via a communications server 128 and accessed by users via a corresponding communications client, such as a communications client 130. A communications platform including the communications server 128 and the communications client 130 may enable instant messaging, voice calls, and/or video calls between users. The presence status 126 may also be utilized by the publishing user to indicate what the publishing user is currently doing (e.g., in a meeting, eating lunch, on vacation, etc.) and/or where the publishing user is currently located (e.g., at work, at home, at Kathy's office, at a client's site, etc.).

In some embodiments, the presence status 126 may affect functionality of the communications client 130 of the publishing user. For example, if the presence status 126 indicates that the publishing user is available to accept incoming communications, then the communications client 130 may be configured to allow the incoming communications from other users. In contrast, if the presence status 126 indicates that the publishing user is busy, then the communications client 130 may be configured to hide or block incoming communications from other users. Different functional states of the communications client 130 may correspond to different presence statuses such that a transition from one presence status to another present status results in a corresponding transition from one functional state to another functional state.

When the presence status determination module 114 determines the presence status 126 of a publishing user, the presence status determination module 114 may select the presence status 126 from a plurality of predefined presence statuses 132 and update a communications platform with the selected presence status 126. Some examples of the predefined statuses 132 may include "available" (e.g., publishing user is online and available for contact), "busy" (e.g., publishing user is busy and does not want to be disturbed), "in a call" (e.g., publishing user is on an audio or video call and does not want to be disturbed), "in a meeting" (e.g., publishing user is in a meeting and does not want to be disturbed), "in a conference call" (e.g., publishing user is in a conference call and does not want to be disturbed), "do not disturb" (e.g., publishing user does not want to be disturbed), "away" (e.g., publishing user is logged in but away from the computer), and "offline" (e.g., publishing user is offline and not available for contact). It should be appreciated that one skilled in the art will contemplate various others presence statuses.

The presence status determination module 114 may determine the presence status 126 based on the AV presence data 122 and/or the other presence data 124. It should be appreciated that one skilled in the art will contemplate various approaches for analyzing the AV presence data 122, with or without the other presence data 124, in order to determine an appropriate presence status. Several illustrative examples of determining the presence status 126 will now be described. In these illustrative examples, the three-dimensional space 116 may be the publishing user's office.

In a first illustrative example, the other presence data 124 may indicate that a publishing user has a meeting scheduled between 2 PM and 3 PM. For example, the publisher user's shared calendar may indicate the scheduled meeting. As a result, the presence status determination module 114 may initially set the presence status 126 of the publishing user to "in a meeting" at 2 PM. However, suppose that the publishing user left the meeting early and is back to her office at 2:30 PM. In conventional implementations, unless the publishing user manually updates the presence status 126, the presence status 126 might incorrectly show that the publishing user is still in a meeting between 2:30 PM and 3 PM.

When the publishing user is back at her office at 2:30 PM, the AV presence data 122 may indicate the presence of the publishing user alone in her office. For example, the visual data 118 may be utilized to determine the presence of a person alone in the office. Here, the user detection module 112 may infer that the person in the office is the publishing user. As such, the presence status determination module 114 may update the presence status 126 from "in a meeting" to "available." In some instances, the visual data 118 may also be utilized to verify the identity of the person in the office as that of the publishing user.

In a second illustrative example, the presence status 126 of the publishing user may be set to "available." The publishing user may not have a meeting scheduled at a current time. However, a second user may enter the publishing user's office in order to discuss an issue. The visual data 118 may be utilized to determine the presence of two persons, and the audio data 120 may be utilized to determine that the two persons are speaking. Here, the user detection module 112 may infer that one of the two persons is the publishing user and that the publishing user is in an ad hoc meeting. As such, the presence status determination module 114 may update the presence status 126 from "available" to "in a meeting."

In some instances, the visual data 118 and/or the audio data 120 may also be utilized to determine the identity of the two persons, the position of the two persons, and/or the posture of the two persons. In one example, the two persons may be positioned near each other and the directions of their voices may indicate that the two persons are talking to each other. This information can be used to verify that the two persons are in a meeting. In another example, the two persons may be identified as the publishing user and a second publishing user. In this case, the user detection module 112 may also update the presence status of the second publishing user to "in a meeting" or "in a meeting in [name of publishing user]'s office."

In a third illustrative example, the publishing user may be at her desk reading a hard copy of a document. As a result, the other presence data 124 may indicate that the publishing user has no recent keyboard/mouse activity. After an extended period of time with no recent keyboard/mouse activity, the presence status determination module 114 may update the presence status 126 of the publishing user from "available" to "away." The visual data 118 may be utilized to determine the presence of a person in the office. The visual data 118 may also be utilized to determine the position of the person as sitting down at a desk. Here, because of the presence of a body in the office and/or the position of the body sitting down at a desk, the user detection module 112 may infer that the publishing user is in the office and available to receive communications. As such, the presence status determination module 114 may update the presence status 126 from "away" to "available."

In a fourth illustrative example, the publishing user may be in her office talking on her mobile telephone. While her office telephone may be operatively coupled to the enterprise infrastructure, her mobile telephone may not be. The visual data 118 may be utilized to determine the presence of a person in the office and the posture of the person in which one hand is raised near the ear. The audio data 120 may also be utilized to determine that the person is speaking. Here, because of the presence and position of the person, the user detection module 112 may infer that the person is the publishing user and that the publishing user is busy on a mobile telephone call. As such, the presence status determination module 114 may update the presence status 126 to "busy," "on the mobile phone," "away," or the like.

As previously described, the presence status determination module 114 may override the previous value of the presence status 126 based, at least in part, on the AV presence data 122. In some embodiments, the publishing user may specify via the communications client 130 that the current status cannot be overridden. For example, the publishing user may not want to be disturbed in the office. As such, the publishing user may set the presence status 126 to "do not disturb" and specify that this status cannot be overridden.

Figure 2:
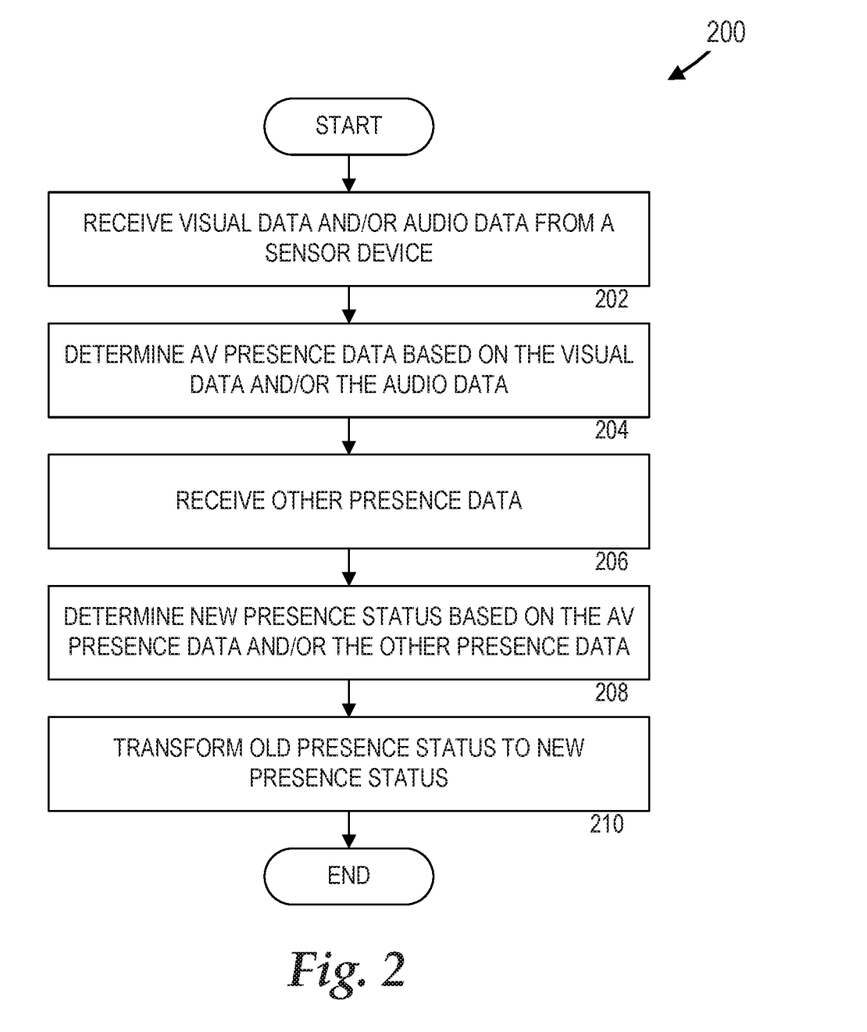
FIG. 2 is a flow diagram illustrating an example method for enhancing a user presence status determination, in accordance with some embodiments.

Referring now to FIG. 2, additional details regarding the operation of the presence determination engine 110 will be provided. FIG. 2 is a flow diagram illustrating an example method for enhancing a user presence status determination, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 2, a routine 200 begins at operation 202, where the presence determination engine 110 receives the visual data 118 and/or the audio data 120 from the sensor device 102. The visual data 118 may include image information and/or depth information obtained by a depth camera in the sensor device 102. The audio data 120 may be obtained by a microphone array also in the sensor device 102. The audio data 120 may contain sufficient information to determine the direction from where each sound originates. After operation 202, the routine 200 proceeds to operations 204 and 206.

At operation 204, the presence determination engine 110 determines the AV presence data 122 based on the visual data 118 and/or the audio data 120. At operation 206, the presence determination engine 110 receives the other presence data 124. The other presence data 124 may be obtained from an enterprise infrastructure, for example. The combination of the AV presence data 122 with the other presence data 124 may improve the accuracy of determining the presence status of a given user. After operations 204 and 206, the routine 200 proceeds to operation 208.

At operation 208, the presence determination engine 110 determines a new presence status of the publishing user based on the AV presence data 122 and/or the other presence data 124. In some embodiments, the presence determination engine 110 may select the new presence status from a plurality of predefined presence statuses 132. After operation 208, the routine 200 proceeds to operation 210, where the presence determination engine 110 transforms an old presence status to the new presence status in a communications platform. After operation 210, the routine 200 may either repeat (e.g., periodically, continuously, or on demand as needed) or terminate.

Figure 3:
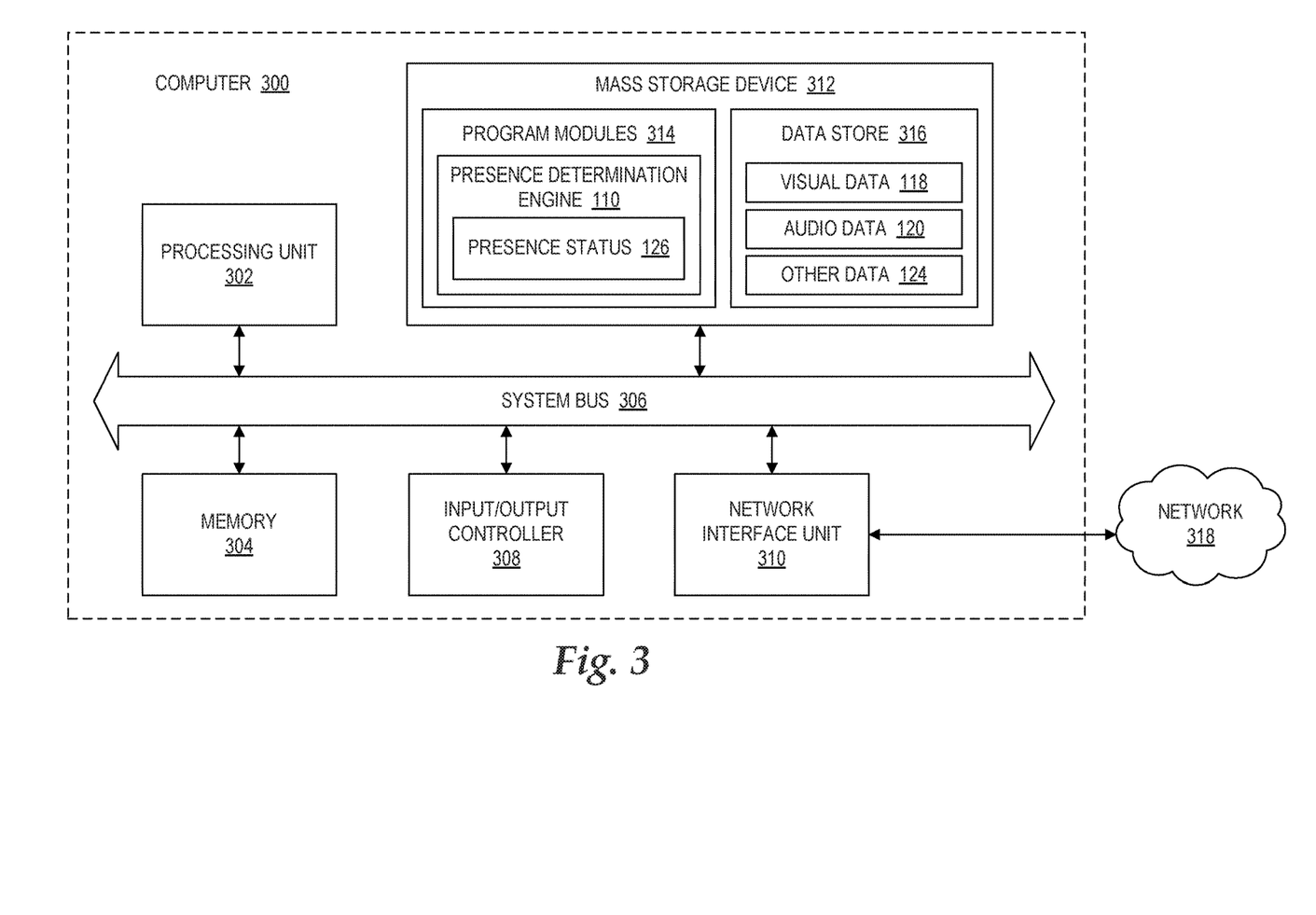
FIG. 3 is a computer architecture diagram showing an illustrative computer hardware architecture for a computing system capable of implementing the embodiments presented herein.

FIG. 3 is an example computer architecture diagram illustrating a computer 300. Examples of the computer 300 may include the computing device 104. The sensor device 102, the communications server 128, and the communications client 130 may also be embodied as computers. The computer 300 may include a central processing unit 302, a system memory 304, and a system bus 306 that couples the memory 304 to the central processing unit 302. The computer 300 may further include a mass storage device 312 for storing one or more program modules 314 and a data store 316. An example of the program modules 314 may include the presence determination engine 110. The data store 316 may store the visual data 118 and/or the audio data 120 obtained from the sensor device 102. The presence determination engine 110 may be configured to determine the presence status 126 based on the visual data 118, the audio data 120, and/or the other presence data 124. The mass storage device 312 may be connected to the processing unit 302 through a mass storage controller (not shown) connected to the bus 306. The mass storage device 312 and its associated computer-storage media may provide non-volatile storage for the computer 300. Although the description of computer-storage media contained herein refers to a mass storage device, such as a hard disk or CD-ROM drive, it should be appreciated by those skilled in the art that computer-storage media can be any available computer storage media that can be accessed by the computer 300.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 300.

According to various embodiments, the computer 300 may operate in a networked environment using logical connections to remote computers through a network 318. The computer 300 may connect to the network 318 through a network interface unit 310 connected to the bus 306. It should be appreciated that the network interface unit 310 may also be utilized to connect to other types of networks and remote computer systems. The computer 300 may also include an input/output controller 308 for receiving and processing input from a number of input devices (not shown), including a keyboard, a mouse, a microphone, and a game controller. Similarly, the input/output controller 308 may provide output to a display or other type of output device (not shown).

The bus 306 may enable the processing unit 302 to read code and/or data to/from the mass storage device 312 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 314 may include software instructions that, when loaded into the processing unit 302 and executed, cause the computer 300 to generate field sets. The program modules 314 may also provide various tools or techniques by which the computer 300 may participate within the overall systems or operating environments using the components, flows, and data structures discussed throughout this description. For example, the program modules 314 may implement interfaces for generating field sets.

In general, the program modules 314 may, when loaded into the processing unit 302 and executed, transform the processing unit 302 and the overall computer 300 from a general-purpose computing system into a special-purpose computing system customized to generate field sets. The processing unit 302 may be constructed from any number of transistors or other discrete circuit elements, which may individually or collectively assume any number of states. More specifically, the processing unit 302 may operate as a finite-state machine, in response to executable instructions contained within the program modules 314. These computer-executable instructions may transform the processing unit 302 by specifying how the processing unit 302 transitions between states, thereby transforming the transistors or other discrete hardware elements constituting the processing unit 302.

Encoding the program modules 314 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 314 may transform the physical state of the semiconductor memory, when the software is encoded therein. For example, the program modules 314 may transform the state of transistors, capacitors, or other discrete circuit elements constituting the semiconductor memory.

As another example, the computer-storage media may be implemented using magnetic or optical technology. In such implementations, the program modules 314 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that concepts and technologies for enhancing the accuracy of a user presence status determination are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for enhancing a user presence status determination, the method comprising:
receiving user presence data for a user, the user presence data comprising one or more of login data, input device data, meeting information from a calendar, or information indicative of usage of a mobile device associated with the user;
determining for the user, based at least in part on the user presence data, a first user presence status from a plurality of user presence statuses;
receiving at least one of visual data from a camera or audio data from a microphone or location data from a geolocation system;
determining for the user, based at least in part on at least one of the visual data or the audio data or the location data, a second user presence status from the plurality of user presence statuses, the second user presence status being different from the first user presence status; and
updating the first user presence status of the user to the second user presence status, the second user presence status being accessible by additional users.

2. The method of claim 1, wherein receiving the location data from the geolocation system includes receiving the location data from a global positioning system (GPS) receiver.

3. The method of claim 1, wherein receiving the location data from the geolocation system comprises receiving the location data from an Internet Protocol (IP) address tracking system.

4. The method of claim 1, wherein receiving the visual data from the camera comprises receiving the visual data from a depth camera.

5. The method of claim 1, wherein receiving the audio data from the microphone comprises receiving the audio data from a microphone array.

6. The method of claim 1, further comprising receiving other presence data, the other presence data comprising at least one of the meeting information from the calendar, the input device data, and the information indicative of usage of the mobile device associated with the user.

7. The method of claim 6, wherein receiving the other presence data comprises receiving the other presence data from an enterprise infrastructure.

8. The method of claim 6, wherein determining the second user presence status includes determining the second user presence data based at least in part on the other presence data and at least one of the visual data or the audio data or the location data.

9. The method of claim 1, further comprising updating the user presence data based on the second user presence status.

10. The method of claim 1, wherein determining the second user presence status based at least in part on at least one of the visual data or the audio data or the location data includes identifying a person based on the visual data, determining an identity of the person based on at least one of facial recognition data, color of clothing, or visual biometrics, and determining whether the identity of the person corresponds to the user.

11. The method of claim 1, wherein determining the second user presence status based at least in part on at least one of the visual data or the audio data or the location data includes identifying a person based on the visual data and determining at least one of a position or a posture of the person.

12. The method of claim 1, wherein determining the second user presence status based at least in part on at least one of the visual data or the audio data or the location data includes identifying a person based on the audio data, determining an identity of the person based on at least one of voice recognition data, speed patterns, or voice biometrics, and determining whether the identity of the person corresponds to the user.

13. A user presence determination system, comprising:
a sensor device comprising at least one of a camera, a microphone, or a GPS receiver;
a processor configured to
determine a first user presence status from a plurality of user presence statuses for a user,
receive at least one of visual data from the camera, audio data from the microphone, and location data from the GPS receiver,
determine, based at least in part on at least one of the visual data, the audio data, and the location data, a second user presence status from the plurality of user presence statuses for the user, the second user presence status being different from the first user presence status, and
update the first user presence status of the user to the second user presence status, the second user presence status being accessible by additional users.

14. The user presence determination system of claim 13, wherein the processor is configured to determine the first user presence status based on a selection of one of the plurality of user presence statuses manually provided by the user.

15. The user presence determination system of claim 13, wherein the processor is configured to determine the first user presence status based on user presence data, the user presence data comprising one or more of login data, input device data, meeting information from a calendar, or information indicative of usage of a mobile device associated with the user.

16. The user presence determination system of claim 13, wherein the processor is further configured to
determine a first user presence status from the plurality of user presence statuses for a second user,
determine, based at least in part on at least one of the visual data, the audio data, and the location data, a second user presence status from the plurality of user presence statuses for the second user, the second user presence status for the second user being different from the first user presence status for the second user, and
update the first user presence status for the second user to the second user presence status for the second user, the second user presence status for the second user being accessible by additional users.

17. Non-transitory computer-readable medium having instructions stored thereon which, when executed by a computer, cause the computer to:
receive user presence data for a user, the user presence data comprising one or more of login data, input device data, meeting information from a calendar, or information indicative of usage of a mobile device associated with the user;

determine a first user presence status from a plurality of user presence statuses for the user based at least in part on the user presence data;

receive at least one of visual data from a camera or audio data from a microphone or location data from a geolocation system;

determine for the user, based at least in part on at least one of the visual data or the audio data or the location data, a second user presence status from the plurality of user presence statuses; and update a user presence status of the user to the second user presence status, the user presence status being accessible by additional users.

18. The non-transitory computer-readable medium of claim 17, wherein receiving the location data from the geolocation system includes receiving the location data from a global positioning system (GPS) receiver.

19. The non-transitory computer-readable medium of claim 17, wherein receiving the location data from the geolocation system includes receiving the location data from an Internet Protocol (IP) address tracking system.

* * * * *